(12) United States Patent
Keller et al.

(10) Patent No.: US 7,747,959 B2
(45) Date of Patent: Jun. 29, 2010

(54) FLEXIBLE AND EXTENSIBLE COMBINATION USER INTERFACES

(75) Inventors: Carl Paul Keller, Danville, CA (US); Bradley Scott Adelberg, San Francisco, CA (US); Michael Eric Flexer, Palo Alto, CA (US); Matthew S. Malden, San Francisco, CA (US)

(73) Assignee: Siebel Systems, Inc., San Mateo, CA (US)

( * ) Notice: Subject to any disclaimer, the term of this patent is extended or adjusted under 35 U.S.C. 154(b) by 810 days.

(21) Appl. No.: 11/015,673

(22) Filed: Dec. 17, 2004

(65) Prior Publication Data

US 2007/0113191 A1    May 17, 2007

(51) Int. Cl.
*G06F 3/048* (2006.01)
(52) U.S. Cl. .................. 715/764; 709/206; 709/217
(58) Field of Classification Search ............... 715/764; 709/206, 217
See application file for complete search history.

(56) References Cited

U.S. PATENT DOCUMENTS

| 6,404,762 | B1 * | 6/2002 | Luzeski et al. ............ 370/352 |
| 6,772,196 | B1 * | 8/2004 | Kirsch et al. ............ 709/206 |
| 7,139,800 | B2 * | 11/2006 | Bellotti et al. ............ 709/206 |
| 2002/0082961 | A1 | 6/2002 | Abrahm et al. ............ 705/35 |
| 2005/0075544 | A1 | 4/2005 | Shapiro et al. ............ 600/300 |
| 2005/0204029 | A1 | 9/2005 | Connolly et al. ............ 709/223 |
| 2005/0235208 | A1 | 10/2005 | Arend et al. ............ 715/712 |
| 2005/0257162 | A1 | 11/2005 | Danninger et al. ............ 715/764 |
| 2006/0136832 | A1 | 6/2006 | Keller et al. ............ 715/765 |

OTHER PUBLICATIONS http://msdn.microsoft.com/library/en-us/dnwui/html/iuiguidelines.asp.
Turbo Tax, 2003.

* cited by examiner

*Primary Examiner*—Boris Pesin
(74) *Attorney, Agent, or Firm*—Campbell Stephenson LLP

(57) ABSTRACT

Flexible and extensible combination user interfaces are described. Combination user interfaces combine task-based and deductive user interfaces in such a manner that complex user interactions can be facilitated using a more meaningful and intuitive user interface than would have been possible using task-based or deductive user interfaces exclusively. The described combination user interfaces are flexible and extensible. They are flexible in that users can work on multiple tasks or switch between tasks without first needing to complete another task. They are extensible in that they can be extended to add, modify, or remove tasks or portions of tasks. User interfaces can be extended by manipulating metadata associated with the user interfaces. The combination user interface can be combined with an Inbox concept to facilitate saving and assigning tasks. The Inbox represents a work queue for a user.

21 Claims, 8 Drawing Sheets

FIG. 3

FLEXIBLE AND EXTENSIBLE COMBINATION USER INTERFACES

TECHNICAL FIELD

The described technology relates generally to user interfaces and, more particularly, to flexible and extensible combination user interfaces.

BACKGROUND

A user interface (UI) of a system is an interface that a user of the system uses to interact with the system. Software applications generally provide a variety of user interfaces, including command-line and graphical. Command-line user interfaces typically enable users to enter commands by typing commands. As an example, MICROSOFT DOS ("MS-DOS") has a command-line user interface. To interact with MS-DOS, users type commands such as "DIR" to retrieve a list of files and directories or "DELETE" to delete a file. On the other hand, graphical user interfaces ("GUIs") provide a collection of "widgets" to users, such as windows, menus, buttons, textboxes, checkboxes, and icons. As is well known in the art, these "primitive" GUI widgets can be used or combined to form other GUI elements such as dialog boxes, list boxes, and combination boxes. Users interact with GUIs with a variety of input devices including keyboards, mice, digital pens, and touchscreens. Examples of computer operating systems that employ GUIs are MICROSOFT WINDOWS and APPLE MAC-OS.

Various models of GUIs for software applications have been proposed, including deductive and task-based. These models are briefly discussed immediately below.

Deductive GUIs require users to deduce functionality provided by a GUI based on experimentation or prior experience. A software application providing deductive GUIs may offer a lot of functionality and flexibility in how users interact with the software application. However, the user may not know what to do at any given time. As an example, when a dialog box is provided to a user, the user may not know whether to click on an OK pushbutton, Cancel pushbutton, provide input, or take some other action. As another example, an application may provide a set of disconnected user interface elements that a user may have to make sense of to accomplish an objective. Such problems are compounded in complex software applications because they use multiple windows, dialog boxes, or other user interface elements. As a result, inexperienced users are often unable to deduce all features provided by software applications that use deductive GUIs.

Task-based GUIs are sometimes used in software applications because they are simpler to use than deductive GUIs. Task-based GUIs are used to help users complete specific tasks. They generally display to users a set of linked dialog boxes along with a means for easily navigating between the dialog boxes in a specific order. "Wizards," which are used by some software applications to help a user to complete a task, are task-based GUIs. Wizards typically have multiple dialog boxes that are linked together and that have pushbuttons marked "Previous" or "Next" to enable the user to switch to a prior or subsequent dialog box. As an example, software applications commonly employ a "setup wizard" to help guide a user who is installing and configuring the software applications. The setup wizard may guide the user during the setup process by providing information about the application, collecting configuration-related information, and performing operations that may be necessary to fully install and configure the software application. Thus, the setup task is successfully and easily completed through use of the setup wizard. Many other examples of task-based GUIs exist, and are employed in a variety of software applications.

Although task-based GUIs are simpler to use than deductive GUIs, they typically only enable users to complete a single task. In contrast, most complex software applications enable users to perform a number of tasks, several of which may be interrelated. Enterprise applications are examples of complex software applications. A customer service enterprise application may enable a user of the application to handle several facets of interactions with an enterprise's customers, such as receiving an order, providing status on a previously placed order, scheduling a follow-up call, assigning tasks to resources, scheduling tasks or resources, receiving and logging a suggestion or complaint from a customer, placing an order with a supplier to complete the customer's order, and so on. Each of these facets of interactions may be considered to be a task or may comprise multiple tasks. As a further example, receiving an order may require the user to complete the following tasks: creating a new customer entry in a database or verifying the customer's delivery and billing information, receiving a list of items being ordered, verifying that the items are in stock or can be back-ordered, receiving credit card information, providing a confirmation number for the order, checking availability of delivery persons, scheduling delivery, scheduling an installation or configuration upon delivery, scheduling a follow-up call to determine satisfaction, and so on.

The user interface of an enterprise software application could become more complex because the user may desire to partially complete a task, switch to another task, and then switch back to the first task. Thus, the user may need to begin or work on multiple tasks without completing a particular task. Compounding the problem further, the user may be unable to complete all tasks, and may need to assign some tasks to others or save the task for further work later.

It would thus be highly desirable to provide a user interface model that combines the sophistication and flexibility of deductive GUIs with the simplicity of task-based GUIs, and also enables users and the software application to assign tasks and resources. Furthermore, it would be highly desirable to enable a user to extend these user interfaces easily.

BRIEF DESCRIPTION OF THE DRAWINGS

FIG. 3 is an image illustrating an example of content that may be displayed in the content area of FIG. 1.

DETAILED DESCRIPTION

Figure 1:
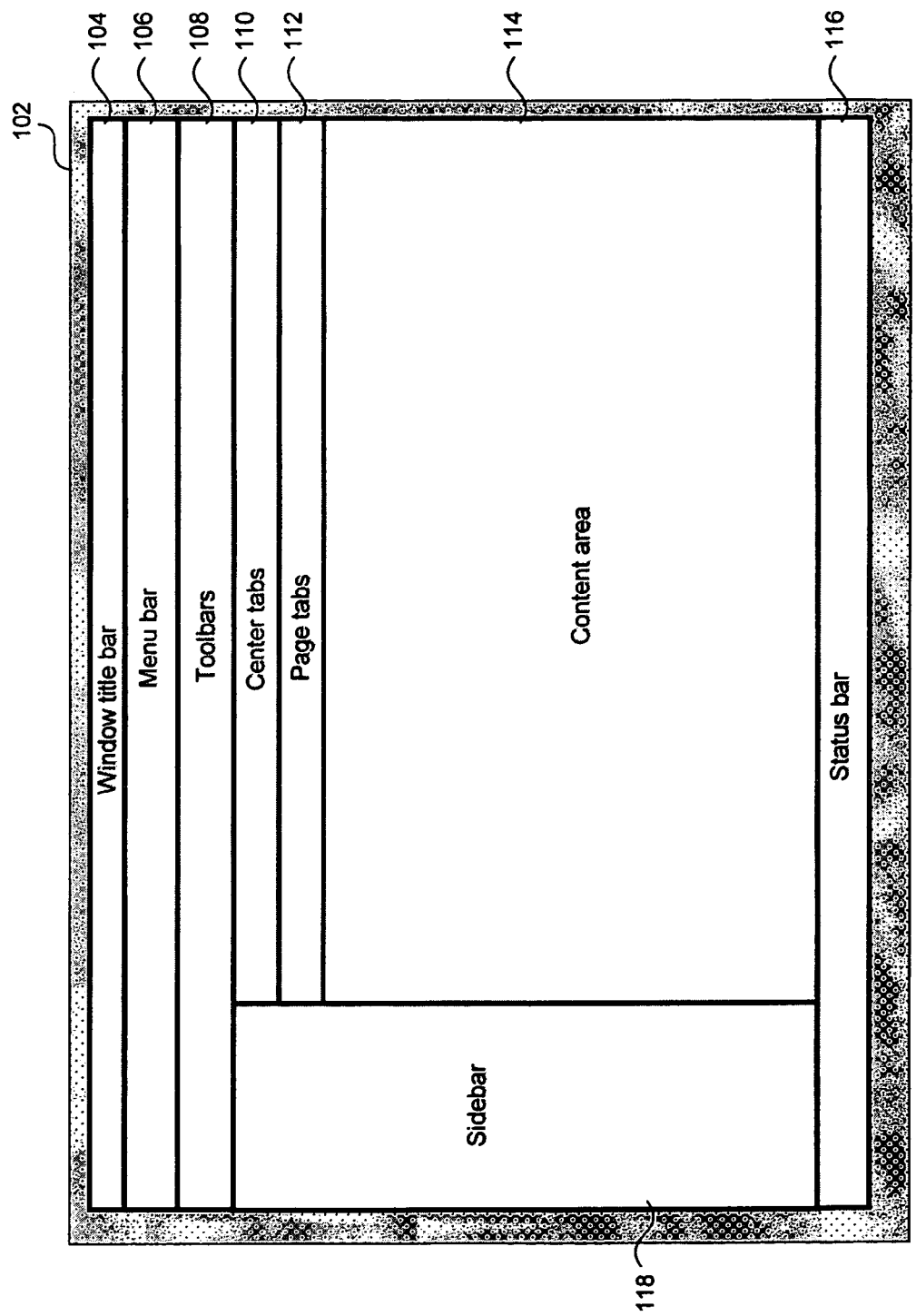
FIG. 1 is a block diagram illustrating portions of a combination user interface.

Flexible and extensible combination user interfaces are described. Combination user interfaces combine task-based and deductive user interfaces in such a manner that complex user interactions can be facilitated using a more meaningful and intuitive user interface than would have been possible using task-based or deductive user interfaces exclusively. Combination user interfaces provide advantages of both types of user interfaces: they are easy to use, provide users with information on what tasks need to be performed and in which order, and walk the users through the tasks. The described combination user interfaces are flexible and extensible. They are flexible in that users can work on multiple tasks or switch between tasks without first needing to complete another task. They are extensible in that they can be extended to add, modify, or remove tasks or portions of tasks. User interfaces can be extended by manipulating metadata associated with the user interfaces. By acquiring software that offers flexible and extensible combination user interfaces, enterprises and other entities can adapt the software to their needs while keeping the software flexible and easy to use, thereby reducing their total cost of ownership.

Such enterprise software can be combined with an Inbox concept to facilitate saving, finding, starting and assigning tasks. The Inbox, which can be directly integrated into the enterprise software, consolidates and displays work that remains to be completed. A user may use the Inbox to, e.g., create and manage tasks. Thus, the Inbox represents a work queue for a user.

Combination User Interfaces

Combination user interfaces combine task-based and deductive user interfaces in a meaningful and intuitive manner. Deductive user interfaces are commonly employed in complex software products, and so will not be discussed in detail in this application. While task-based user interfaces are used in some types of applications, they are not prevalent in enterprise software systems. They are also not generally extensible. Consequently, implementation of extensible task-based interfaces is provided in some detail below.

A task is a unit of activity that can be performed as a sequence of one or more steps. Examples of tasks include receiving a customer's contact information, opening a bank account, verifying creditworthiness, approving a loan application, transferring a balance from one bank to another, approving a credit card application, and so on. Multiple tasks may each be subtasks of a high-level task (e.g., a goal). As an example, accepting a new bank customer may be a goal and may comprise opening a bank account, transferring a balance from an account at another bank, and approving a credit card application. Banking software may provide several goals to a banker, such as: accept new customer, manage customer accounts, and close customer accounts. Each of these goals may comprise several tasks, as indicated above. The goals may be presented using semantics of standard deductive user interfaces, such as tabs or menu choices on a main window of an application. After selection of a goal, multiple tasks of the goal may be presented.

Goals may also be presented by inferring a user's intent. A user's intent may be inferred, e.g., based on a user's selection of information to be displayed, or tasks to be performed. As an example, when a user is viewing pending sales, the user may wish to see a revenue forecast.

Turning now to the figures, FIG. 1 is a block diagram illustrating portions of a window containing a combination user interface. An illustrated window 102 comprises multiple parts, each part containing various content relating to the combination user interface. The window may have a window title bar 104. The window and the window title bar generally correspond to an application, such as an enterprise application. The enterprise application generally has a menu bar 106, and toolbars 108. The menu bar provides a menu relating to the application. Menu bars and toolbars may be provided with the application, and may also be extended by administrators of the application.

The application may further comprise center tabs 110 and page tabs 112. These areas may be used by the application to provide tabs. A center tab is a user interface element that may display one or more page tabs in the user interface. A page tab is a user interface component that, when selected, may display a page of the user interface. Upon receiving a tab selection from a user, the application may display various input regions in a content area (discussed in further detail immediately below). The application may, e.g., populate the page tabs area depending on which tasks have been (or can be) begun.

The window additionally comprises a content area 114. The application provides a variety of content in the content area and may use the content area to receive input from the user. As an example, the content area may be used to provide information relating to a caller and may have an input region in which the user types information relating to the caller. The content area may also provide navigation controls, such as Previous, Next, Save for Later, OK, and Cancel. Navigation controls are further described below in greater detail.

In various embodiments, when a page tab is selected by a user, the content area may display various information relating to a task associated with the page tab, such as text boxes, input regions, and so on.

A status bar 116 may be used by the application to provide status information relating to the application.

A sidebar 118 may be used to display information that may not change depending on the application's context. As an example, the sidebar may be used to display news information, information about a caller, or a list of goals, such as in an application dashboard. In various embodiments, the sidebar may also display information that may change depending on the application's content.

Figure 2:
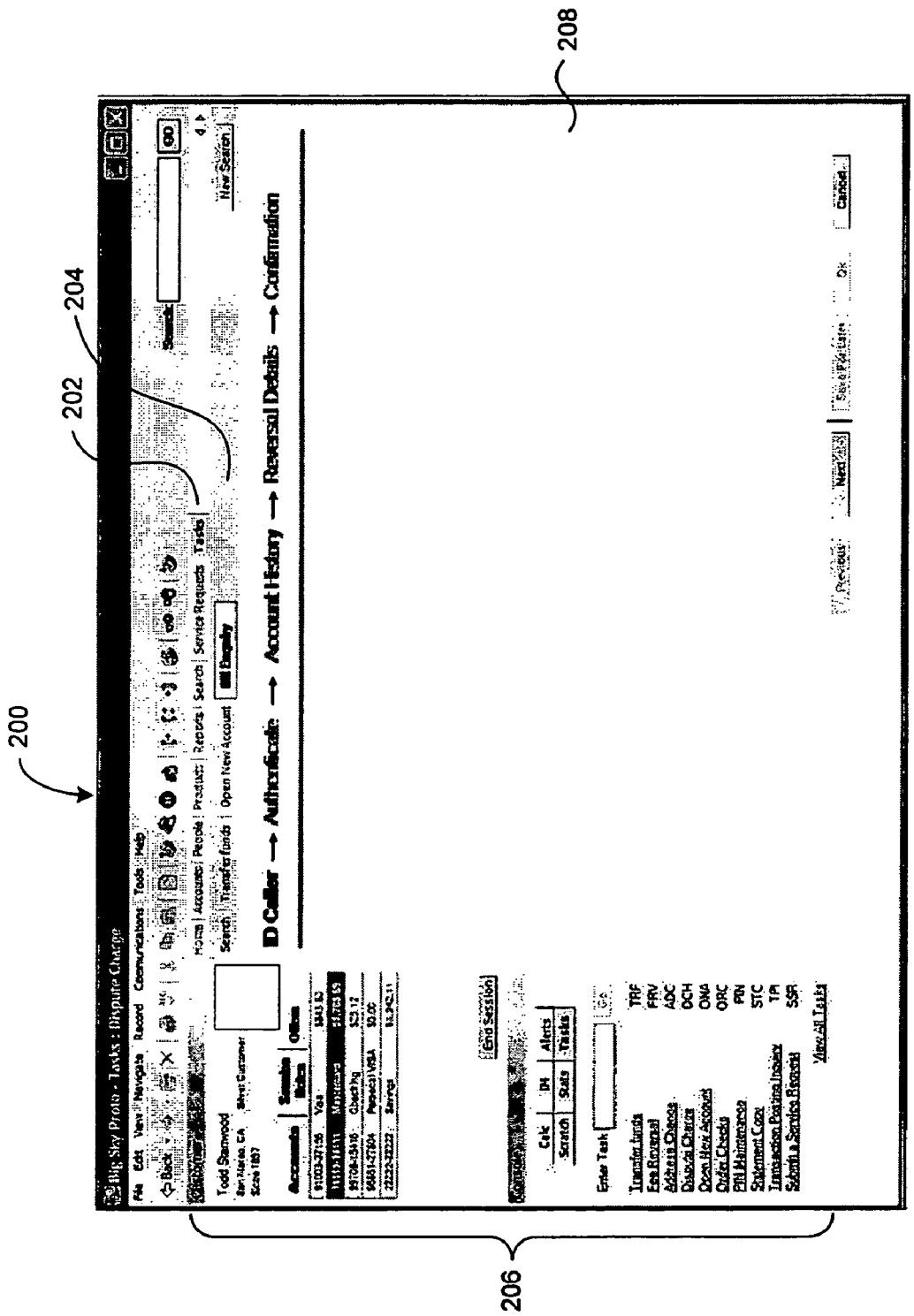
FIG. 2 is an image illustrating an example of an enterprise application using the combination user interface of FIG. 1.

FIG. 2 is an image illustrating an example of an enterprise application using the combination user interface. An image 200 has window portions corresponding to the window portions described in relation to FIG. 1.

More specifically, center tabs area 202 illustrates eight tabs: Home, Accounts, People, Products, Reports, Search, Service Requests, and Tasks. According to the illustration, the Tasks tab has been selected. The selected tab can be displayed in bold or colored, or have some other indication of selection.

Page tabs area 204 illustrates four tabs representing ongoing tasks: Search, Transfer Funds, Open New Account, and Bill Enquiry. According to the illustration, the Bill Enquiry tab has been selected. The selected tab can be displayed in bold or colored, or have some other indication of selection.

A sidebar 206 illustrates two components: a customer region indicating details about a calling customer and a console region indicating a variety of tools (e.g., calculator, instant messenger, alerts, scratchpad, call statistics, and tasks or goals). The listed tasks are transfer funds, fee reversal, address change, dispute charge, and so on.

After selecting a goal or task (e.g., bill enquiry), a banker may begin a task or chapter (e.g., identify the caller). While the customer provides information relating to his identity, the customer may also indicate a desire to open a new account and transfer funds into it. The banker, prior to completing the bill enquiry goal, may also begin the new account and transfer funds goals.

The banker can switch between the account opening and bill enquiry tasks without losing work in either task. The banker can also save goals and tasks for further work, and assign them to another person, e.g., a branch manager, for completion. These features are discussed in further detail below.

As is illustrated in the page tabs area, the banker has chosen the bill enquiry task. The bill enquiry task is illustrated by a progress indicator to have the following chapters, which are subparts of tasks: identify caller, authenticate, account history, reversal details, and confirmation. A page appearing in content area 208 may relate to a chapter or a task. A page may be associated with multiple tasks, but may only appear once per task. In various embodiments, a page may appear multiple times for a task, e.g., when business logic so requires. As is discussed below in further detail in relation to FIG. 3, the progress indication provides an indication of chapters and the user's progress through the chapters. A user may quickly navigate to a chapter (e.g., a page of the task) by clicking on the chapter's label.

Goals or high-level tasks can be invoked by a user or by the application program. The user can invoke tasks from, e.g., a task search page or shortcuts appearing in various parts of the application (e.g., in the sidebar). Modules of the application, such as applets that provide a portion of an application's user interface or business process objects that enforce business rules, may also invoke goals or tasks. As used in this specification and the claims, an applet is a user interface element. It may or may not correspond to "sandboxed applications," such as JAVA applets.

The content area 208 is illustrated as being empty. In an embodiment, pages of a task may be displayed in modal dialogs rather than pages in the content area.

Figure 3:
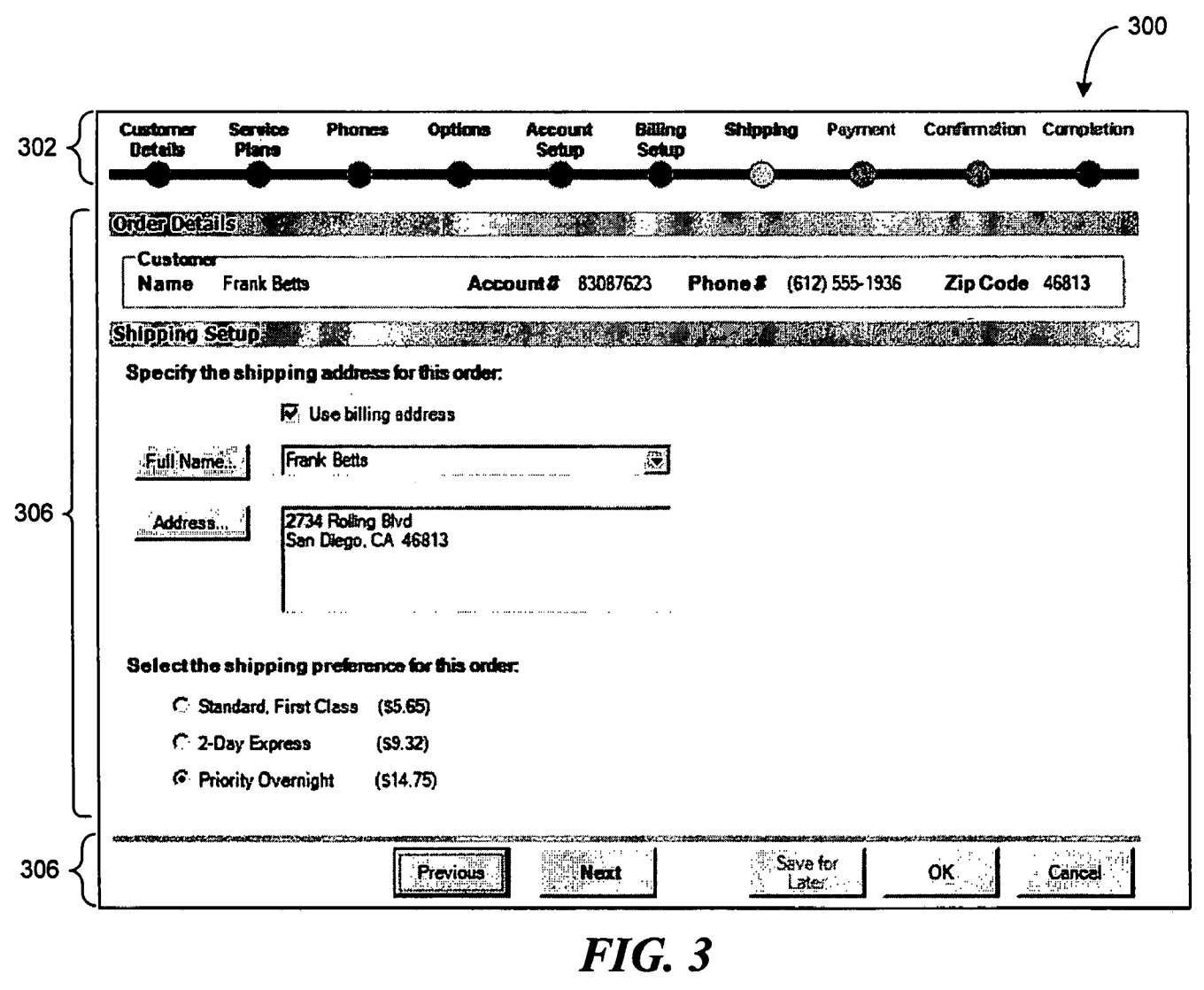

FIG. 3 is an image 300 illustrating an example of content that may be displayed in the content area of FIG. 1. The content comprises a progress indication 302, details area 304, and navigation area 306.

The progress indication provides an indication of progress through tasks, such as through chapters of a task. In the illustrated example, the chapters are Customer Details, Service Plans, Phones, and so on. The user's progress through the chapters may be displayed in a variety of ways. As an example, the user's progress may be displayed using colors or graying to show which chapters have been completed, what the current chapter is, what upcoming chapters exist, which chapters are incomplete, etc. Other indications are also possible.

The details area comprises text, input fields, and various other user interface elements that may be used to provide information to. or receive input from, the user.

The navigation area comprises UI controls that a user may use to navigate between chapters. These controls are discussed in further detail in relation to FIG. 4.

Figures 4, 5:
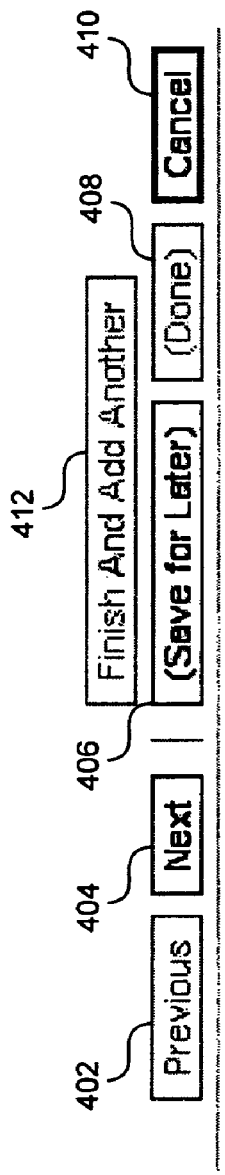
FIG. 4 is an image illustrating an example of UI controls that may appear in a navigation area.
FIG. 5 is an image illustrating an example of an Inbox.

FIG. 4 is an image illustrating an example of UI controls that may appear in a navigation area. Generally, each task page (e.g., comprising a chapter) is displayed in sequence, one at a time, within the content area (or within a popup task window). To navigate from one task page to another, the user may select UI controls that appear in the navigation area. The navigation area may have standard UI controls and extended UI controls.

Standard UI controls may appear on every task page by default. The illustrated example has Previous 402, Next 404, Save for Later 406, Done 408, and Cancel 410 UI controls.

Selecting the Previous UI control causes the application to display a prior task page in the sequence. Selecting the Next UI control causes the application to display a next task page in the sequence. Navigating to a next or previous task page may cause the application to save information, such as user input. This saved information may be retrieved when the user returns to the task page, e.g., prior to completing the high-level task. The sequence may be consecutively defined, or may be defined based on conditions. As an example, a next page in a sequence may be selected based on input received from the user in a text input region appearing on a task page. Selecting the Save for later UI control causes the application to save the task, including the task's chapters and subtasks, so that the task can be resumed later. In various embodiments, selecting the Save for Later UI control causes the application to save the goal and its tasks so that the goal and tasks can be resumed later. The application may also periodically perform the behavior associated with the Save for Later UI control automatically, e.g., for system recovery purposes. The application may also perform the automatic saving when a user navigates to another task page. The application may also close the task pages associated with the task. Selecting the Done UI control causes the application to close the task pages associated with the task. If the task is not yet saved, the user may be asked whether the task should be saved or abandoned. Selecting the Cancel UI control may cause the application to cancel the task. In such a case, user input may not be saved, and the task's state may revert to its state before the user most recently began work on it.

In various embodiments, a task's data may only be stored in a local data context and not shared with other users until the task completes.

The standard UI controls may be configurable. As an example, they may be configurable at runtime depending on user input so that a UI control is unavailable for selection unless the user provides some input for one or more input regions. Alternatively, a task or chapter may be defined to enable or disable particular UI controls. As an example, a task may be defined as not enabling the Save for Later UI control.

As the application navigates between task pages, it may perform various functions, such as validating user input, saving information, determining a next task page in the sequence, loading information for the next task page of the sequence, and so on. An administrator of the system may add logic that should be executed when, e.g., starting a task page, navigating between task pages, or closing a task page. Business logic for tasks, including validation logic, may also be performed or evaluated during task navigation.

Extended UI controls have special behaviors and may not appear in every task page. A "Finish and Add Another" UI control 412 may be associated with some task pages. This UI control may be useful in situations where a task may be performed multiple times in succession (e.g., to add multiple items to an order). Selecting this UI control may finish the task as if the user had pressed the Done UI control and then created another instance of the task. Other extended UI controls may also be available.

As previously stated, users may navigate to any task page in a sequence by selecting, e.g., the name of the chapter in the progress indication area. Such navigation may also be subject to various rules, such as validation of user input.

From a user's perspective, tasks may be atomic in nature. That is, until the user finishes the task, none of the user's changes may be visible to others. Thus, the system may support having private and public data contexts. The private data context would be used until the task is indicated as complete. Thereafter, the saved data may be moved to the public data context so that others can access data of the task.

In various embodiments, the data contexts may be stored in an extensible markup language (XML) or in a relational database. When data is stored in XML, it may not be connected to other database components, such as business logic. In such a case, logic that provides automatic behavior, such as enforcement of business rules, may need to be explicitly performed or triggered by a task page or its associated components (e.g., navigation logic).

As can be seen from the preceding discussion, combination user interfaces combine task-based and deductive user interfaces in a meaningful and intuitive manner.

Inbox

FIG. 5 is an image illustrating an example of an Inbox. The illustrated example shows multiple entries in the Inbox, referred to as items. Each item may have an indication of a date 502, priority 504, type 506, area 508, description 510, and source 512. The date may provide an indication of when an item, e.g., a task, was added to the Inbox. Alternatively, the date may provide an indication of when a task was created. The priority may provide an indication of a relative priority for an item in the Inbox. The priority may be assigned by an entity creating a task. Alternatively, the priority may be assigned or changed by a person handling the task. The type may be an indication of whether an item in the Inbox is a task or something else. Examples of non task items are activities, messages, appointments, "to-do's," and so on. The area may indicate, e.g., a classification for an item in the Inbox, and may be identified by an entity creating the item. The description may provide a more specific identification for an item and may similarly be identified by an entity creating the item. The source for an item may be an indication of an entity creating the item.

Items of the Inbox may also have an indication of associated actions 514. Each item may be associated with an action, such as item 515. This item is associated with a Mark as Done action. The action indication may be determined based on contents of the item. As an example, an expense report item may need to be approved. On the other hand, a work item may need to be marked as done.

A selection area 516 may be used to provide various views of the Inbox. As an example, the selection area may be used to provide a list of unassigned items in all accessible queues, as illustrated in FIG. 6.

Figures 6, 7:
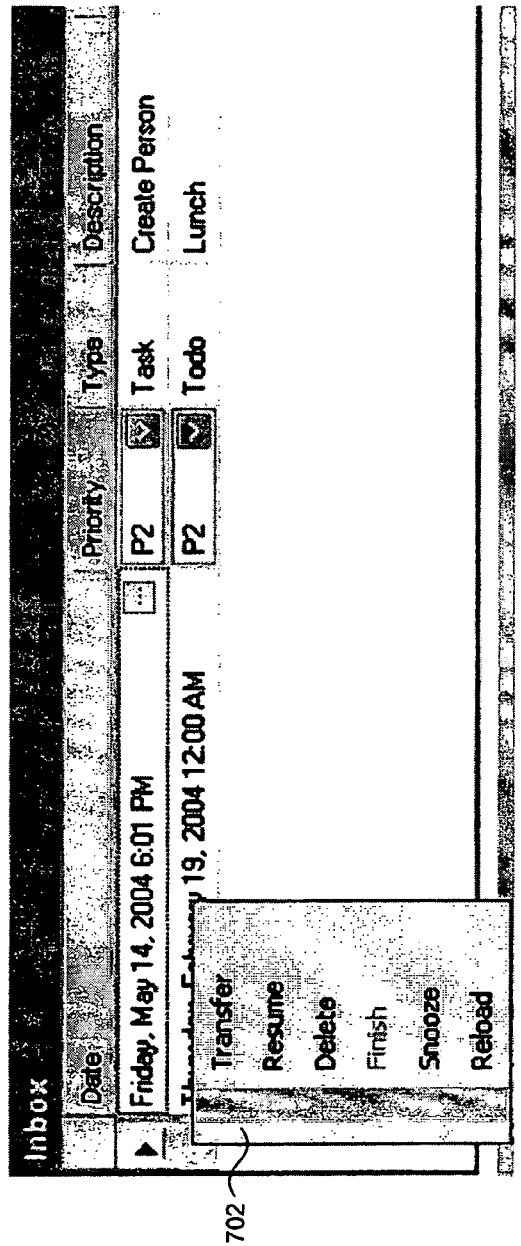
FIG. 6 is an image illustrating an example of an Inbox displaying unassigned items.
FIG. 7 is an image illustrating an example of an Inbox displaying a context menu.

FIG. 6 is an image illustrating an example of an Inbox displaying unassigned items. A user may select this view to work on unassigned tasks. As an example, a supervisor may use this view to assign (e.g., transfer) unassigned tasks to other users, such as the supervisor's subordinates.

FIG. 7 is an image illustrating an example of an Inbox displaying a context menu 702. The context menu may be displayed by, e.g., right-clicking on an item of the Inbox or by depressing a context menu key on a keyboard. The context menu comprises the following choices: Transfer, Resume, Delete, Finish, Snooze, and Reload. The selected choice would apply to the item on which the context menu is invoked. In various embodiments, the commands indicated in the context menu may be available in other parts of the application in addition to (or instead of) the context menu, such as a main menu of the application. In various embodiments, the Reload choice may not depend on the item selected, and may cause the displayed page to be refreshed, e.g., to reload information from storage.

A user can transfer an item of the Inbox, e.g., a task instance, to another owner by selecting Transfer from the Inbox context menu. This causes the application to show a dialog box that can be used to select a new owner for the item. When the transfer request is completed, the Inbox may be refreshed. Upon refreshing the Inbox, the transferred item may no longer appear in the Inbox.

A user can resume a task from the Inbox by selecting Resume from the context menu. When a task is resumed, the application retrieves information about the task from a previously saved snapshot and reconstructs the task, including all data previously input by a user. Reconstructing the task instance from a snapshot restores the task's state and data contexts. Validation rules may be checked when the task resumes. The task may be canceled if the rules fail to indicate that the task can be resumed.

A user can delete a task from the Inbox by selecting Delete from the context menu. The Inbox may be refreshed after the task is deleted.

An item in the Inbox may be finished by selecting Finish in the Inbox context menu. Selecting this command may mark the item as finished and removes it from the Inbox. The item may be capable of being finished, e.g., when its validating conditions can be satisfied without first displaying a task page.

Inbox items may be associated with reminders, such as reminders to complete a task. As an example, an Inbox item may "pop up" a dialog every morning to remind a user that a task is incomplete. A user may "snooze" these reminders by, e.g., 1 day, 1 week, 1 month, etc. When an item is snoozed, it may not appear in a default Inbox view until the snooze period expires. Selecting this command may cause a dialog box to appear in which the user may indicate a period of time during which an Inbox item should be snoozed.

Figure 8:
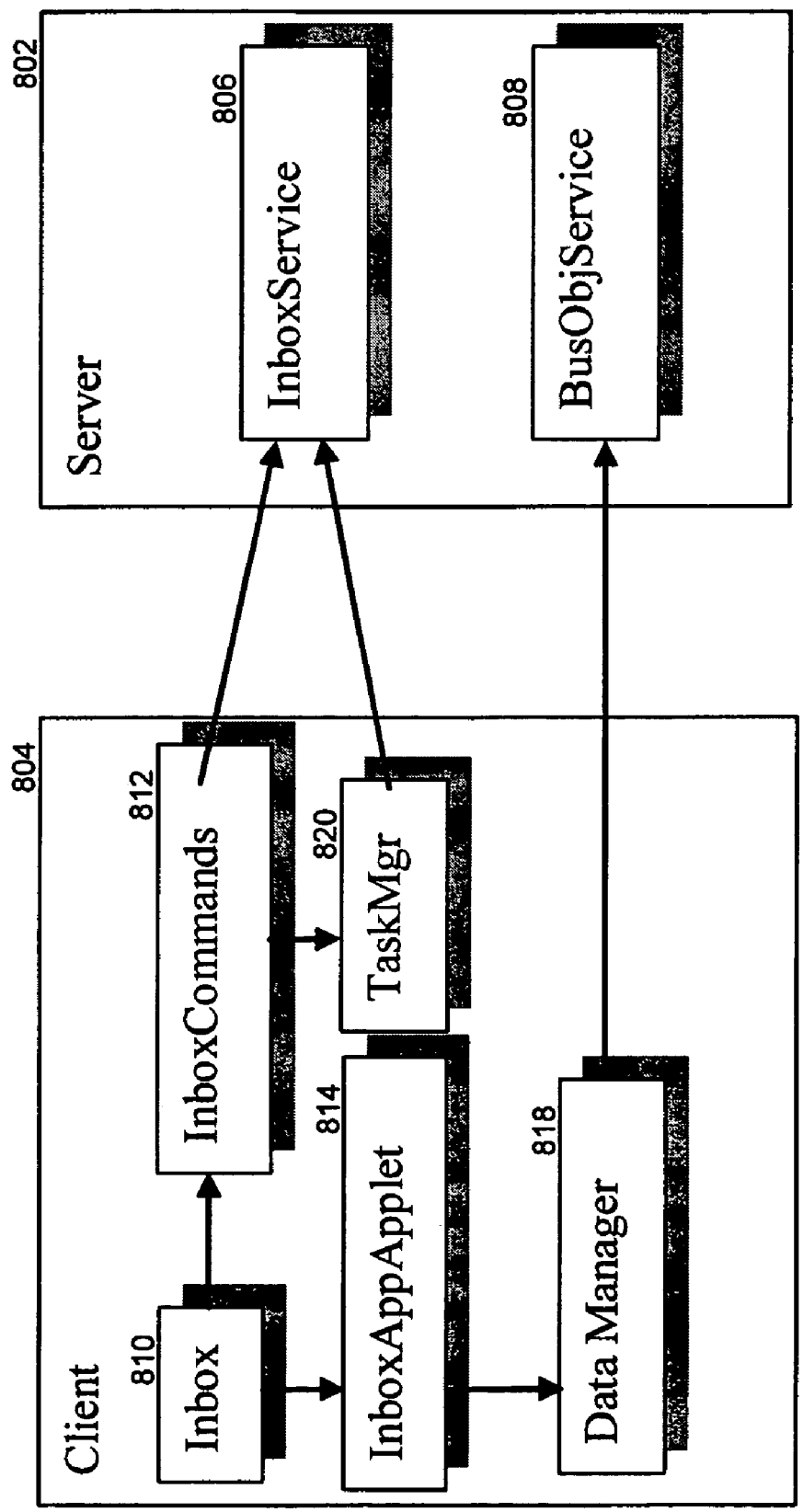
FIG. 8 is a block diagram illustrating a suitable architecture for implementing flexible and extensible combination user interfaces in various embodiments.

FIG. 8 is a block diagram illustrating a suitable architecture for implementing flexible and extensible combination user interfaces in various embodiments. While this figure illustrates, and the following describes, a suitable architecture for implementing the user interfaces discussed above, other suitable embodiments of the architecture are equally contemplated. The architecture comprises a server 802 and a client 804.

The server comprises an Inbox Service 806, Business Objects Service 808 ("BusObjService"), and a Metadata Service 828. The Inbox Service may be implemented as a web service that provides support for Inbox and task user interfaces of the client. As an example, the Inbox Service may provide an application program interface to an application to request and submit Inbox items, such as tasks. The Inbox Service may request the BusObjService for database queries and updates. The BusObjService may determine which data contexts should be used to store or retrieve data. As an example, the BusObjService may determine that an incomplete task should be saved to and retrieved from a private data context. The Metadata Service is described in further detail below.

The client comprises an Inbox applet 810, InboxCommands object 812, InboxAppApplet object 814, Data Manager object 818, and TaskMgr object 820.

The Inbox applet provides a UI for the Inbox. This UI is discussed in detail above, e.g., in relation to FIG. 5. The Inbox applet interacts with other objects, such as the InboxCommands and InboxAppApplet objects to, e.g., manipulate items in the Inbox, populate lists, and so on. Some of these interactions are described in further detail below.

The InboxCommands object provides a UI command set interface to the context menu used in the Inbox applet. The InboxCommands object may implement these and other commands: Transfer, Cancel, Delete, Finish, Resume, Snooze, and DrillDown. The DrillDown command may be called when a hyperlink associated with an item in the Inbox, e.g., a description, is selected by a user. Drilling down on a task item may start or resume the task. The remaining commands listed here have been described in detail above. In various embodiments, additional commands may be added by a system administrator. In various embodiments, the InboxCommands object may implement logic for commands of the Inbox applet.

The InboxAppApplet may be used by the Inbox applet to, e.g., populate a list of Inbox items. The InboxAppApplet may retrieve information used to populate the list using the Data Manager object. The InboxAppApplet may also retrieve other information relating to Inbox items using the Data Manager object, and provide this information to the Inbox applet. Thus, the InboxAppApplet may provide an abstraction layer between the Data Manager object and the Inbox applet. Consequently, a variety of Data Manager objects may be used without having to revise logic of the InboxAppApplet object or Inbox applet. In various embodiments, the InboxAppApplet may be used when an Inbox page is first loaded, and the Inbox applet may request another component for further data queries.

The Data Manager object provides an interface to data repositories, such as databases. It exposes an application program interface (API) that enterprise applications and other software modules of the system can use to interact with data. The API of the Data Manager provides a variety of functions, including the following: it makes requests to the BusObjService object on the server for queries and updates; binds UI controls to data; provides validation logic; provides formatting logic; attaches client-side business logic; attaches logic that enables a single UI control to bind to multiple data fields; provides logic to insert, update, or delete information from a database; maintains relationships between data from different sources; handles data-related problems, such as concurrency violations, server-side validations that fail, or missing or delayed data; and provides support for virtualization, which provides only necessary data rather than all available data.

The TaskMgr object may be used to manage tasks, such as starting a new task instance, canceling, saving, suspending, resuming, finishing, or snoozing tasks, and so on. The TaskMgr object may provide an API for other objects to perform these operations with tasks, and may also utilize an API provided by an Inbox component, such as the InboxService, to interact with the Inbox in relation to tasks.

The TaskMgr object may also interact with a MetadataMgr object that handles repository-related metadata, such as task metadata. A repository is a storage of information, such as in a database. The MetadataMgr object may provide an interface between components of the system and metadata, and provide an interface to the repository. Metadata comprises information about data, and may be used, e.g., to represent information that can be used to generate a UI without providing programming logic (e.g., source code) that implements the UI.

The MetadataMgr comprises a client-side component 826 that may communicate with a server-side component 828 to manage metadata.

The client-side MetadataMgr component may accept requests from client code for repository objects and object definitions. It may cache retrieved object definitions as necessary, and perform deserialization of repository definitions into instances of C# classes. C# is a programming language. Once a definition is deserialized into a C# class, other components that may target MICROSOFT .NET may be able to use such an object. The client-side TaskMgr component may also provide an extensibility mechanism that enables methods and properties to be added to the metadata.

The server-side MetadataMgr component ("Metadata Service") may be a web service that accepts requests from the client-side MetadataMgr component for repository objects, determines relationships between objects and their associations based on relationship information stored in the repository, and causes the retrieval of these objects.

The TaskMgr object may also interact with a Task object 822 that handles tasks, such as to store and manage task states, determine in which sequence chapters should be performed, and evaluate conditional sequencing.

Various components of the system may utilize an Object Expression Engine 824 that evaluates query language expressions. As an example, the Object Expression Engine may be used to evaluate a condition when a user completes a chapter, and branch to another chapter according to the evaluated condition.

Figure 9:
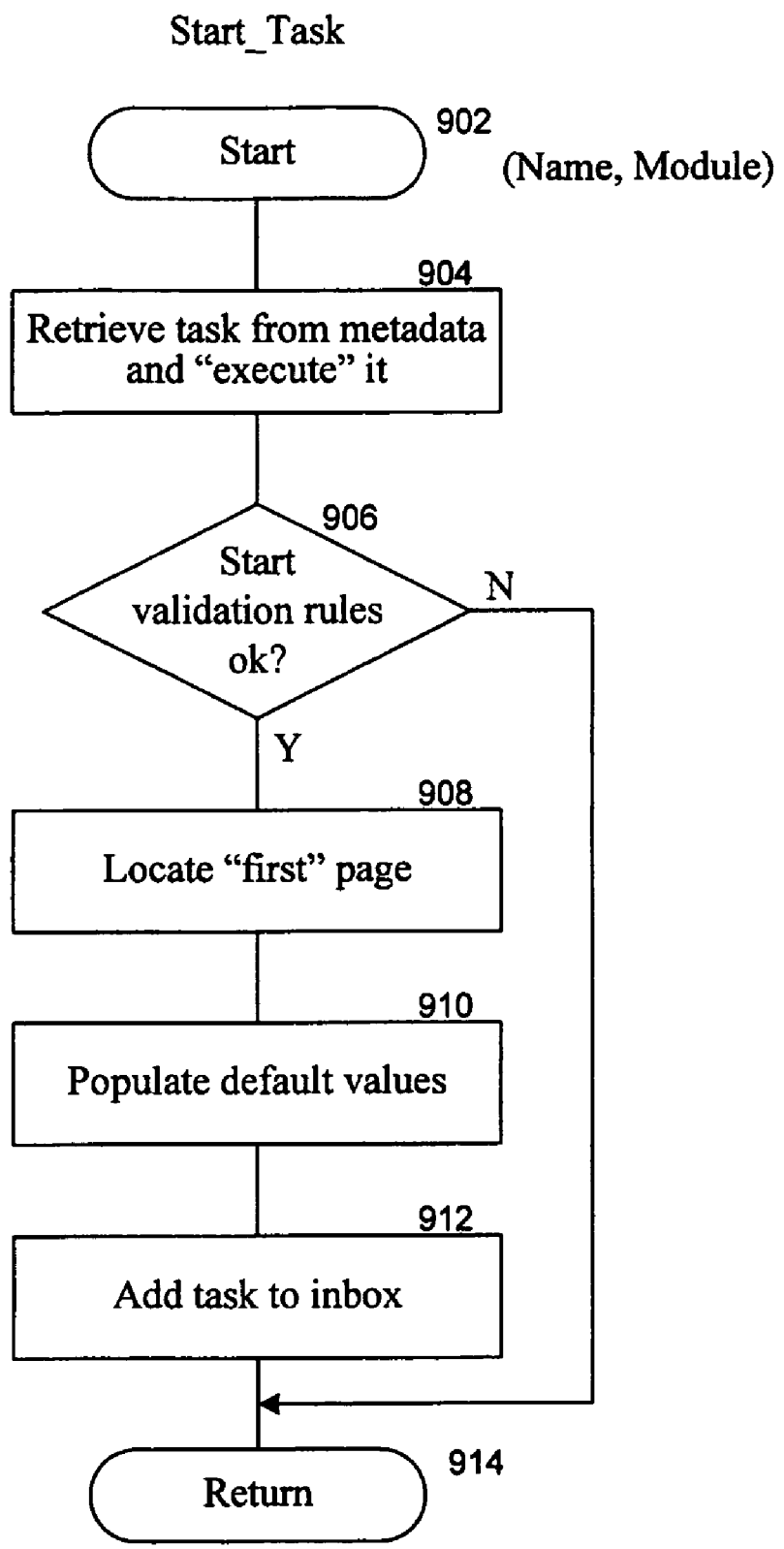
FIG. 9 is a flow diagram illustrating a routine for starting a task.

FIG. 9 is a flow diagram illustrating a routine for starting a task. The routine may be performed by the TaskMgr when a user starts the task. A user may start a task from an Inbox, an application dashboard, a task search page, or elsewhere. The routine starts at block 902, where it receives the task's name and a name for a module where the task definition is provided as parameters. The routine may also receive other arguments (not shown), such as to set defaults, control branching of task pages, and so on.

At block 904, the task definition is retrieved using the MetadataMgr. The TaskMgr then creates the new Task instance based on the definition. During instantiation of the Task, the task's data context objects and initial task state are created. The task is then executed based on its definition.

At block 906, the task checks rules defined in startTask event validation rules. If all the rules evaluate to true, the routine continues at block 908. Otherwise, the routine continues at block 914, after optionally providing an error to the user indicating that the task cannot be started. At block 908, the routine initiates a stepping sequence at a first step of the task, as defined in the metadata. If the task has defined an initial sequence of processing steps, methods specified in those processing steps will be executed until the first page step is found. Conditional branching logic may be evaluated at the end of each step. By performing these steps, possibly iteratively, a first page for the task would be located.

At block 910, the routine sets up default values for the controls in the page based on task parameters, field values in metadata or data contexts, or defined expressions.

If the Task instance starts successfully, the TaskMgr at block 912 makes a request to the InboxService to add the task to the Inbox. The new task's row ID may be returned by the InboxService and stored. The task's row ID may be used in subsequent task operations to refer to the task instance in the Inbox.

The routine returns at block 914.

Figure 10:
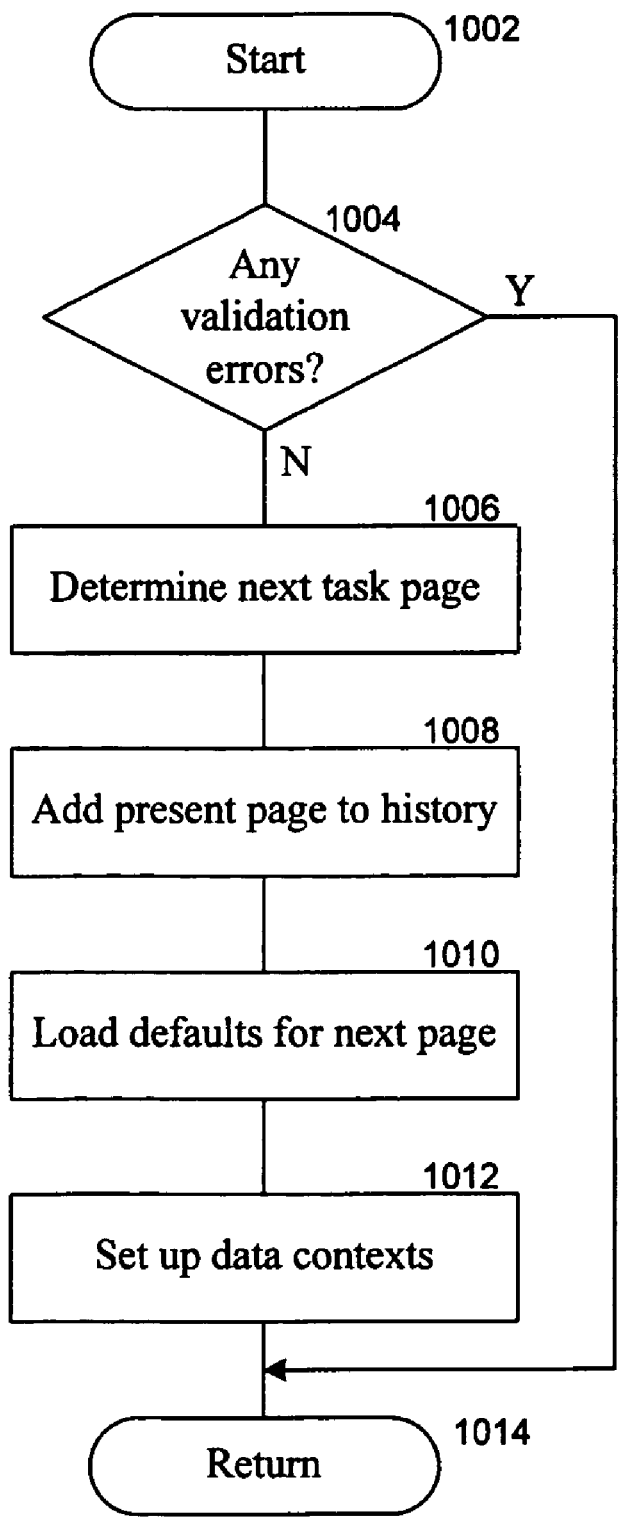
FIG. 10 is a flow diagram illustrating a routine for navigating to a next task page.

FIG. 10 is a flow diagram illustrating a routine for navigating to a next task page. The routine begins at block 1002. The routine may be called, e.g., when a user selects a Next button on a navigation area of a task page.

At block 1004, the routine determines whether any validation errors exist on the task page. If there are navigation errors, the routine continues at block 1014, possibly after presenting an error to the user indicating that navigation is not allowed. Otherwise, the routine continues at block 1006.

At block 1006, the routine determines a next task page. The next task page may be determined by checking metadata associated with the task page, executing methods defined in the metadata, and evaluating conditional branching expressions.

At block 1008, upon determining the next task page, the present task page (i.e., the task page on which the user selected the Next UI control) is added to a history. The history may be used by the user, e.g., to return to the present page by selecting a Previous button on a navigation area of the next task page.

At block 1010, the routine loads defaults for the next page. As an example, defaults may be loaded from metadata or by evaluating expressions.

At block 1012, the routine sets up data contexts (e.g., private or public) for the next task page. The data context may be set up to connect to a database.

The routine returns to its caller at block 1014.

The following describes some data used in the system. Wherever "task" is indicated, the data may be equally applied to "goals" and "chapters."

A task may comprise a number of fields, including the following: a displayable title; an indication of a categorization for the task; an indication of a data context associated with the task instance (e.g., private or public); fields that may be used to populate the Inbox applet (e.g., priority); indications of various attributes, such as whether the task can be completed, deleted, or transferred to another user; an indication of metadata for the task's page; and indications of applets (e.g., UIs) that provide header and footer content for the task's page; and indications of rules, such as validation rules to be checked upon navigation.

As previously described, an administrator can modify or extend an enterprise application in the system by manipulating metadata. The following metadata fragments provide some examples.

The following fragment defines a task named Step0 that invokes an InitializationData method and then moves to Step1.

```
<step xsi:type="TaskProcStepType">
    <name>Step0</name>
    <nextStep>
        <condition/>
        <targetStep>Step1</targetStep>
    </nextStep>
    <chapter>Chapter1</chapter>
    <command>InitializeData</command>
</step>
```

The following defines Step1, which displays a task page that uses a data context called PersonPageDC to map to data. Some fields used in the page are defined as pre-populated with default values. The next step is Step2.

```
<step xsi:type="TaskPageStepType">
    <name>Step1</name>
    <nextStep>
        <condition/>
        <targetStep>Step2</targetStep>
    </nextStep>
    <chapter>Chapter1</chapter>
    <defaultValue>
        <targetField>
            <dataContext>Person</dataContext>
            <path>Person.JobTitle</path>
        </targetField>
        <expression>'Business Analyst'</expression>
    </defaultValue>
    <defaultValue>
```

-continued

```
        <targetField>
            <dataContext>Person</dataContext>
            <path>Person.TaxNum</path>
        </targetField>
        <expression>'111-11-1111'</expression>
    </defaultValue>
    <defaultValue>
        <targetField>
            <dataContext>Person</dataContext>
            <path>Person.CompanyId</path>
        </targetField>
        <sourceField>
            <busComp>
                <type:module>Samples</type:module>
                <type:name>Account</type:name>
            </busComp>
            <field>Id</field>
        </sourceField>
    </defaultValue>

<type:module>Samples</type:module>
        <type:name>DemoCreatePerson1</type:name>

<dataContextDefLink>
        <taskContext>Person</taskContext>
        <pageContext>PersonPageDC</pageContext>
    </dataContextDefLink>
</step>
```

Step2 illustrates an example of using conditional branching. It executes a FindDups( ) method for unifying a record. The conditional branching expression specifies that the next step should be Step3 if there is a duplicated record in the PersonDups data context. Otherwise, the task continues at Step4.

```
<step xsi:type="TaskProcStepType">
    <name>Step2<name>
    <nextStep>
        <condition>COUNT(Child("PersonDups")) GT 0</condition>
        <targetStep>Step3</targetStep>
    </nextStep>
    <nextStep>
        <condition/>
        <targetStep>Step4</targetStep>
    </nextStep>
    <chapter>Chapter2</chapter>
    <command>FindDups</command>
</step>
```

The following defines use of extended UI controls in a header and footer portion of a task page:

```
<headerApplet>
    <type:module>Samples</type:module>
    <type:name>TaskOptionalButtonsHeaderApplet</type:name>
</headerApplet>
<footerApplet>
    <type:module>Samples</type:module>
    <type:name>TaskOptionalButtonsFooterApplet</type:name>
</footerApplet>
```

Fragments of an Inbox metadata are illustrated below. The metadata fragment shows a definition of an InboxAppApplet that handles an Applet_Load event for getting a user's Inbox records from the Data Manager. The metadata also defines the InboxCommands as a command set class that will handle the menu commands.

```
<?xml version="1.0" encoding="utf-8"?>
<applet xmlns:xsd="http://www.w3.org/2001/XMLSchema"
xmlns="urn:siebel:nexus:repos:applet"
xmlns:allcontrols="urn:siebel:nexus:repos:controls:allcontrols"
xmlns:control="urn:siebel:nexus:repos:control"
xmlns:menu="urn:siebel:nexus:repos:menu"
xmlns:type="urn:siebel:nexus:repos:type"
xmlns:xsi="http://www.w3.org/2001/XMLSchema-instance"
xsi:schemaLocation="urn:siebel:nexus:repos:applet
..\..\..\..\repos-type\types\Applet.xsd
urn:siebel:nexus:repos:controls:allcontrols ..\..\..\..\repos-
type\types\controls\AllControls.xsd">
        <name:xmlns="urn:siebel:nexus:repos:type">DemoInboxApplet</name>
        <appClass>
                <type:module>Samples</type:module>
                <type:name>InboxAppApplet</type:name>
        </appClass>
        <commandSetClass>
                <type:module>Samples</type:module>
                <type:name>InboxCommands</type:name>
        </commandSetClass>
```

The following metadata fragment defines a context menu associated with the Inbox applet. Two menu items in the context menu are shown below.

```
<contextMenu>
    <menu:menuItem>
        <menu:command>
            <menu:name>InboxTransfer</menu:name>
        </menu:command>
        <menu:text>
            <type:glossary>
                <type:module>Samples</type:module>
                <type:name>glos</type:name>
            </type:glossary>
            <type:key>Transfer</type:key>
        </menu:text>
    </menu:menuItem>
    <menu:menuItem>
        <menu:command>
            <menu:name>InboxResume</menu:name>
        </menu:command>
        <menu:text>
            <type:glossary>
                <type:module>Samples</type:module>
                <type:name>glos</type:name>
            </type:glossary>
            <type:key>Resume</type:key>
        </menu:text>
    </menu:menuItem>
    .......
</contextMenu>
```

The InboxService may have the following web services type definition:

```
<portType name="InboxPortType">
    <operation name="addTask">
        <input message="tns:addTask" />
        <output message="tns:addTaskResponse" />
    </operation>
    <operation name="cancelTask" >
        <input message="tns:cancelTask" />
        <output message="tns:cancelTaskResponse" />
    </operation>
    <operation name="deleteActivity">
        <input message="tns:deleteActivity" />
        <output message="tns:deleteActivityResponse" />
    </operation>
    <operation name="deleteTask">
        <input message="tns:deleteTask" />
        <output message="tns:deleteTaskResponse" />
    </operation>
    <operation name="finishActivity">
        <input messaqe="tns:finishActivity" />
        <output message="tns:finishActivityResponse" />
    </operation>
    <operation name="finishTask">
        <input message="tns:finishTask" />
        <output message="tns:finishTaskResponse" />
    </operation>
    <operation name="getCheckpoint">
        <input message="tns:getCheckpoint" />
        <output message="tns:getCheckpointResponse" />
    </operation>
    <operation name="getSavepoint">
        <input message="tns:getSavepoint" />
        <output message="tns:getSavepointResponse" />
    </operation>
    <operation name="setCheckpoint">
        <input message="tns:setCheckpoint" />
        <output message="tns:setCheckpointResponse" />
    </operation>
    <operation name="setSavepoint">
        <input message="tns:setSavepoint" />
        <output message="tns:setSavepointResponse" />
    </operation>
    <operation name="startTask">
        <input message="tns:startTask" />
        <output message="tns:startTaskResponse" />
    </operation>
    <operation name="snoozeActivity">
        <input message="tns:snoozeActivity" />
        <output message="tns:snoozeActivityResponse" />
    </operation>
    <operation name="snoozeTask">
        <input message="tns:snoozeTask" />
        <output message="tns:snoozeTaskResponse" />
    </operation>
    <operation name="suspendTask">
        <input message="tns:suspendTask" />
        <output message="tns:suspendTaskResponse" />
    </operation>
    <operation name="transferActivity">
        <input message="tns:transferActivity" />
        <output message="tns:transferActivityResponse" />
    </operation>
    <operation name="transferTask">
        <input message="tns:transferTask" />
        <output message="tns:transferTaskResponse" />
```

```
        </operation>
    </portType>
```

The following provide examples of commands of the Inbox. The addTask request adds a test task:

```
<addTaskRequest>
    <taskName>Test Task #1</taskName>
    <ownerId>1 ★KL</ownerId>
    <assignerId >1★PL</assignerId>
    <priority>3 - Medium</priority>
    <dueDate >2004-03-27T15:48:55.906-08:00</dueDate>
    <description>test task</description>
</addTaskRequest>
```

The following sample shows an addTask response that contains a task record row id of 1-3839.

```
<addTaskResponse>
    <addTaskResult>1-3839</addTaskResult>
</addTaskResponse>
```

As previously described, subsequent commands or operations on the task may specify the task record row-id. As an example, the following may cancel the task:

```
<cancelTaskRequest>
    <taskId>1-3839</taskId>
</cancelTaskRequest>
```

A "true" response may indicate that the cancel operation succeeded.

```
<cancelTaskResponse>
    <cancelTaskResult>true</cancelTaskResult>
</cancelTaskResponse>
```

As discussed above, task instances in the Inbox can be transferred to another user. A transferTask operation may assign a task to another user by updating an owner Id field in the task record. A sample of the request is shown below. The request takes as parameters a task record row Id, a new owner Id, and optionally a task snapshot to be saved.

```
<transferTaskRequest>
    <taskId>1-3839</taskId>
    <newOwnerId>1*MF</newOwnerId>
    <Snapshot>
        <taskName>DemoCreatePerson</taskName>
        <history>
            <string>Page4</string>
            <string>Page5</string>
            <string>Page6</string>
        </history>
        <contexts>
            <DataContextSnapshot>
                <Name>PersonDup</Name>
                <DataMember>Person</DataMember>
                <AbstractBusObjName>Person</AbstractBusObjName>
                <QueryOnReposition>true</QueryOnReposition>
                <DefaultTimeout>600</DefaultTimeout>
                <BusComps>
                    <BusCompSnapshot>
                        <Name>Person</Name>
                        <Path>Person</Path>
                        <SearchSpec>Id LIKE 'Task'</SearchSpec>
                        <WorkSetSize>10</WorkSetSize>
                        <Fields/>
                    </BusCompSnapshot>
                </BusComps>
            </DataContextSnapshot>
        </contexts>
        <defaultedSteps>
            <string>Page1</string>
            <string>Page2</string>
            <string>Page3</string>
        </defaultedSteps>
    </Snapshot>
</transferTaskRequest>
```

The XML fragments above can be manipulated to change the behavior of an enterprise application.

The XML schema of a task follows:

```
<?xml version="1.0" encoding="UTF-8"?>
<xs:schema targetNamespace="urn:siebel:nexus:repos:task"
xmlns:type="urn:siebel:nexus:repos:type" xmlns:xs="http://www.w3.org/2001/XMLSchema"
xmlns:task="urn:siebel:nexus:repos:task" xmlns:objmgr="urn:siebel:nexus:repos:om"
xmlns:class="urn:siebel:nexus:repos:class" elementFormDefault="qualified"
attributeFormDefault="unqualified">
    <xs:import namespace="urn:siebel:nexus:repos:type" schemaLocation="Type.xsd"/>
    <xs:import namespace="urn:siebel:nexus:repos:om" schemaLocation="OM.xsd"/>
        <xs:import namespace="urn:siebel:nexus:repos:class" schemaLocation="Class.xsd"/>
    <xs:complexType name="TaskType">
        <xs:annotation>
            <xs:documentation>type for a task definition</xs:documentation>
        </xs:annotation>
        <xs:complexContent>
            <xs:extension base="type:BaseType">
                <xs:sequence>
                    <xs:element name="title" type="type:GlossaryRefType" nillable="false">
                        <xs:annotation>
                            <xs:documentation>displayable task title</xs:documentation>
```

-continued

```
                    </xs:annotation>
                </xs:element>
                <xs:element name="allowFwdNav" type="xs:boolean" default="false"
nillable="false">
                    <xs:annotation>
                        <xs:documentation>whether to allow forward map navigation or
not</xs:documentation>
                    <xs:annotation>
                </xs:element>
                <xs:element name="taskClass" type="class:ClassRefType" minOccurs="0">
                    <xs:annotation>
                        <xs:documentation>reference to the task class</xs:documentation>
                    </xs:annotation>
                </xs:element>
                <xs:element name="dataContextDef" type="task:TaskDataContextDefType"
minOccurs="0" maxOccurs="unbounded">
                    <xs:annotation>
                        <xs:documentation>the data context associated with this
task</xs:documentation>
                    </xs:annotation>
                </xs:element>
                <xs:element name="step" type="task:TaskStepType" minOccurs="0"
maxOccurs="unbounded">
                    <xs:annotation>
                        <xs:documentation>a step in the task</xs:documentation>
                    </xs:annotation>
                </xs:element>
                <xs:element name="chapter" type="task:TaskChapterType"
maxOccurs="unbounded">
                    <xs:annotation>
                        <xs:documentation>a chapter in the task</xs:documentation>
                    </xs:annotation>
                </xs:element>
                <xs:element name="firstStep" type="xs:string" nillable="false">
                    <xs:annotation>
                        <xs:documentation>the first step in the flow</xs:documentation>
                    </xs:annotation>
                </xs:element>
                <xs:elememt name="defaultPriority" type="xs:string">
                    <xs:annotation>
                        <xs:documentation>default priority of the task</xs:documentation>
                    </xs:annotation>
                </xs:element>
                <xs:element name="allowComplete" type="xs:boolean" default="true"
minOccurs="0">
                    <xs:annotation>
                        <xs:documentation>whether to allow the task to be
completed.</xs:documentation>
                    <xs:annotation>
                </xs:element>
                <xs:element name="allowDelete" type="xs:boolean" default="true"
minOccurs="0">
                    <xs:annotation>
                        <xs:documentation>whether to allow the task instance to be
deleted.</xs:documentation>
                    </xs:annotation>
                </xs:element>
                <xs:element name="allowSave" type="xs:boolean" default="true" minOccurs="0">
                    <xs:annotation>
                        <xs:documentation>whether to allow the task instance to be suspended
and saved for later.</xs:documentation>
                    </xs:annotation>
                </xs:element>
                <xs:element name="allowSnooze" type="xs:boolean" default="true"
minOccurs="0">
                    <xs:annotation>
                        <xs:documentation>whether to allow the task to be
snoozed.</xs:documentation>
                    </xs:annotation>
                </xs:element>
                <xs:element name="allowTransfer" type="xs:boolean" default="true"
minOccurs="0">
                    <xs:annotation>
                        <xs:documentation>whether to allow the task instance to be transferred
```

-continued

```
to another owner.</xs:documentation>
                    </xs:annotation>
                </xs:element>
                <xs:element name="headerApplet" type="type:TypedObjRefType">
                    <xs:annotation>
                        <xs:documentation>header applet associated with this task</xs:documentation>
                        <xs:appinfo>
                            <type:objRefInfo>
                                <type:type>Applet</type:type>
                            </type:objRefInfo>
                        </xs:appinfo>
                    </xs:annotation>
                </xs:element>
                <xs:element name="footerApplet" type="type:TypedObjRefType">
                    <xs:annotation>
                        <xs:documentation>footer applet associated with this task</xs:documentation>
                        <xs:appinfo>
                            <type:objRefInfo>
                                <type:type>Applet</type:type>
                            </type:objRefInfo>
                        </xs:appinfo>
                    </xs:annotation>
                </xs:element>
                <xs:element name="cancelTaskValidationRule" type="task:TaskValidationRuleType" minOccurs="0" maxOccurs="unbounded">
                    <xs:annotation>
                        <xs:documentation>Validation logic to execute when a cancel task event occurs.</xs:documentation>
                    </xs:annotation>
                </xs:element>
                <xs:element name="deleteTaskValidationRule" type="task:TaskValidationRuleType" minOccurs="0" maxOccurs="unbounded">
                    <xs:annotation>
                        <xs:documentation>Validation logic to execute when a delete task event occurs.</xs:documentation>
                    </xs:annotation>
                </xs:element>
                <xs:element name="finishTaskValidationRule" type="task:TaskValidationRuleType" minOccurs="0" maxOccurs="unbounded">
                    <xs:annotation>
                        <xs:documentation>Validation logic to execute when a finish task event occurs.</xs:documentation>
                    </xs:annotation>
                </xs:element>
                <xs:element name="resumeTaskValidationRule" type="task:TaskValidationRuleType" minOccurs="0" maxOccurs="unbounded">
                    <xs:annotation >
                        <xs:documentation>Validation logic to execute when a resume task event occurs.</xs:documentation>
                    </xs:annotation>
                </xs:element>
                <xs:element name="startTaskValidationRule" type="task:TaskValidationRuleType" minOccurs="0" maxOccurs="unbounded">
                    <xs:annotation>
                        <xs:documentation>Validation logic to execute when a start task event occurs.</xs:documentation>
                    </xs:annotation>
                </xs:element>
            </xs:sequence>
        </xs:extension>
    </xs:complexContent>
</xs:complexType>
<xs:complexType name="TaskStepType" abstract="true">
    <xs:annotation>
        <xs:documentation>abstract type for a step</xs:documentation>
    </xs:annotation>
    <xs:sequence>
        <xs:element name="name" type="xs:string">
            <xs:annotation>
                <xs:documentation>the name of a step</xs:documentation>
            </xs:annotation>
        </xs:element>
        <xs:element name="nextStep" type="task:TaskNextStepType" minOccurs="0" maxOccurs="unbounded">
            <xs:annotation>
                <xs:documentation>the name of a step</xs:documentation>
            </xs:annotation>
```

-continued

```
            </xs:element>
            <xs:element name="chapter" type="xs:string">
                <xs:annotation>
                    <xs:documentation>the name of a chapter where this step resides</xs:documentation>
                </xs:annotation>
            </xs:element>
            <xs:element name="defaultValue" type="task:TaskDefaultValueType" minOccurs="O" maxOccurs="unbounded">
                <xs:annotation>
                    <xs:documentation>default value for the step</xs:documentation>
                </xs:annotation>
            </xs:element>
        </xs:sequence>
    </xs:complexType>
    <xs:complexType name="TaskNextStepType">
        <xs:annotation>
            <xs:documentation>concrete type for a nextStep</xs:documentation>
        </xs:annotation>
        <xs:sequence>
            <xs:element name="condition" type="xs:string" minOccurs="0">
                <xs:annotation>
                    <xs:documentation>a simple expression which leads to the next step</xs:documentation>
                </xs:annotation>
            </xs:element>
            <xs:element name="targetStep" type="xs:string">
                <xs:annotation>
                    <xs:documentation>the step to go to should the expression is true</xs:documentation>
                </xs:annotation>
            </xs:element>
        </xs:sequence>
    </xs:complexType>
    <xs:complexType name="TaskPageStepType">
        <xs:annotation>
            <xs:documentation>concrete type for a page (UI) step</xs:documentation>
        </xs:annotation>
        <xs:complexContent>
            <xs:extension base="task:TaskStepType">
                <xs:sequence>
                    <xs:element name="page" type="type:TypedObjRefType">
                        <xs:annotation>
                            <xs:documentation>page associated with this step</xs:documentation>
                            <xs:appinfo>
                                <type:objRefInfo>
                                    <type:type>Page</type:type>
                                </type:objRefInfo>
                            </xs:appinfo>
                        </xs:annotation>
                    </xs:element>
                    <xs:element name="dataContextDefLink" type="task:TaskDataContextDefLinkType" minOccurs="0" maxOccurs=unbounded>
                        <xs annotation>
                            <xs:documentation>data Context link associated with this page</xs:documentation>
                        </xs:annotation>
                    </xs:element>
                </xs:sequence>
            </xs:extension>
        </xs:complexContent>
    </xs:complexType>
    <xs:complexType name="TaskProcStepType">
        <xs:annotation>
            <xs:documentation>concrete type for a processing step</xs:documentation>
        </xs:annotation>
        <xs:complexContent>
            <xs:extension base="task:TaskStepType">
                <xs:sequence>
                    <xs:element name="command" type="xs:string">
                        <xs:annotation>
                            <xs:documentation>the command for this processing step</xs:documentation>
                        </xs:annotation>
                    </xs:element>
                    <xs:element name="reverseCommand" type="xs:string" minOccurs="0">
                        <xs:annotation>
                            <xs:documentation>the reverse command for this processing
```

```
step</xs:documentation>
                    </xs:annotation>
                </xs:element>
            </xs:sequence>
        </xs:extension>
    </xs:complexContent>
</xs:complexType>
<xs:complexType name="TaskChapterType">
    <xs:annotation>
        <xs:documentation>type for a chapter definition</xs:documentation>
    </xs:annotation>
    <xs:sequence>
        <xs:element name="name" type="xs:string"/>
        <xs:element name="title" type="type:GlossaryRefType"/>
        <xs:element name="mapText" type="type:GlossaryRefType" minOccurs="0"/>
        <xs:element name="mapTooltip" type="type:GlossaryRefType" minOccurs="0"/>
    </xs:sequence>
</xs:complexType>
<xs:complexType name="TaskDataContextDefType">
    <xs:annotation>
        <xs:documentation>type for a task data context definition</xs:documentation>
    </xs:annotation>
    <xs:sequence>
        <xs:element name="name" type="xs:string"/>
        <xs:element name="abstractBusObj" type="xs:string" minOccurs="0"/>
        <xs:element name="rootBusComp" type="objmgr:BusCompRefType" minOccurs="0"/>
        <xs:element name="busCompSpec" type="task:TaskBusCompSpecType" minOccurs="0" maxOccurs="unbounded"/>
        <xs:element name="allowSerialize" type="xs:boolean" default="true" minOccurs="0">
            <xs:annotation>
                <xs:documentation>whether to allow the data context to be serialized when task is saved.</xs:documentation>
            </xs:annotation>
        </xs:element>
        <xs:element name="queryOnResume" type="xs:boolean" default="false" minOccurs="0">
            <xs:annotation>
                <xs:documentation>whether to re-query the data context when task is resumed.</xs:documentation>
            </xs:annotation>
        </xs:element>
    </xs:sequence>
</xs:complexType>
<xs:complexType name="TaskDataContextDefLinkType">
    <xs:annotation>
        <xs:documentation>type for a task data context link definition</xs:documentation>
    </xs:annotation>
    <xs:sequence>
        <xs:element name="taskContext type="xs:string"/>
        <xs:element name="path"type="xs:string" minOccurs="0"/>
        <xs:element name="pageContext" type="xs:string"/>
    </xs:sequence>
</xs:complexType>
<xs:complexType name="TaskBusCompSpecType">
    <xs:annotation>
        <xs:documentation>type for a task buscomp definition</xs:documentation>
    </xs:annotation>
    <xs:sequence>
        <xs:element name="path" type="xs:string"/>
        <xs:element name="searchSpec" type="xs:string" minOccurs="0"/>
        <xs:element name="sortSpec" type="xs:string" minOccurs="0"/>
        <xs:element name="registerField" type="xs:string" minOccurs="0" maxOccurs="unbounded"/>
    </xs:sequence>
</xs:complexType>
<xs:complexType name="TaskDefaultValueType">
    <xs:annotation>
        <xs:documentation>type for defining a task default value</xs:documentation>
    </xs:annotation>
    <xs:sequence>
        <xs:element name="targetField" type="task:TaskDataContextType">
            <xs:annotation>
                <xs:documentation>the dataContext and path to the field that will be filled with the default value.</xs:documentation>
            </xs:annotation>
        </xs:element>
        <xs:choice>
            <xs:element name="expression" type="xs:string">
                <xs:annotation>
                    <xs:documentation>expression which evaluation result is the default
```

-continued

```
value. Expression can also includes constant.</xs:documentation>
                </xs:annotation>
            </xs:element>
            <xs:element name="parameter" type="xs:string">
                <xs:annotation>
                    <xs:documentation>name of a task paramater where the default value comes from</xs:documentation>
                </xs:annotation>
            </xs:element>
            <xs:element name="sourceField" type="task:TaskBusCompFieldType">
                <xs:annotation>
                    <xs:documentation>the field where the default value comes from.</xs:documentation>
                </xs:annotation>
            </xs:element>
        </xs:choice>
    </xs:sequence>
</xs:complexType>
<xs:complexType name="TaskDataContextType">
    <xs:sequence>
        <xs:element name="dataContext"type="xs:string" minOccurs="0"/>
        <xs:element name="path"type="xs:string"/>
    </xs:sequence>
</xs:complexType>
<xs:complexType name="TaskBusCompFieldType">
    <xs:sequence>
        <xs:element name="busComp" type="objmgr:BusCompRefType"/>
        <xs:element name="field" type="xs:string"/>
    </xs:sequence>
</xs:complexType>
<xs:element name="task" type="task:TaskType">
    <xs:annotation>
        <xs:documentation>the top-level element for a task</xs:documentation>
        <xs:appinfo>
            <type:typeInfo>
                <type:name>Task</type:name>
                <type:addition>false</type:addition>
                <type:category>UI</type:category>
                <type:description>A simple process that interacts directly with the user</type:description>
            </type:typeInfo>
        </xs:appinfo>
    </xs:annotation>
</xs:element>
<xs:complexType name="TaskValidationRuleType">
    <xs:annotation>
        <xs:documentation>Type for defining a task event validation criteria</xs:documentation>
    </xs:annotation>
    <xs:sequence>
        <xs:element name="errorPrompt" type="type:GlossaryRefType" minOccurs="0">
            <xs:annotation>
                <xs:documentation>An explanation or instruction to display when the validation fails.</xs:documentation>
            </xs:annotation>
        </xs:element>
        <xs:choice>
            <xs:element name="command" type="xs:string">
                <xs:annotation>
                    <xs:documentation>A method to invoke for validating the task event. The method should return a boolean value.</xs:documentation>
                </xs:annotation>
            </xs:element>
            <xs:element name="expression"type="xs:string">
                <xs:annotation>
                    <xs:documentation>Boolean expression to evaluate for validating the task event.</xs:documentation>
                </xs:annotation>
            </xs:element>
        </xs:choice>
    </xs:sequence>
</xs:complexType>
</xs:schema>
```

The described system may be used with MICROSOFT .NET (e.g., using "WinForms" or "ASP.NET"), JAVA 2 PLATFORM ENTERPRISE EDITION (which is commonly referred to as "J2EE"), and a variety of other operating environments.

In various embodiments, a task may comprise one or more subtasks. A subtask may be a reusable component that provides functionality to a task. As an example, a subtask may provide business logic or a user interface element. Multiple tasks may use such subtasks.

In various embodiments, a goal may comprise tasks. A task may comprise chapters. A chapter may comprise steps. A step may comprise task pages, subtasks, and additional program logic.

From the foregoing, it may be appreciated that specific embodiments of the invention have been described herein for purposes of illustration, but that various modifications may be made without deviating from the spirit and scope of the invention. Accordingly, the invention is not limited except as by the appended claims.

We claim:

1. A computer system the computer system comprising:
a first data storage for storing a state of a task of a user, wherein the task is a unit of activity that can be performed as a sequence of multiple steps, and
a goal comprises the task and a second task;
a second data storage for storing metadata, the metadata identifying elements of a user interface and indicating properties relating to the elements, the metadata enabling flexibility and extensibility of the user interface through additions and modifications of the metadata, wherein
the metadata comprises a unit of metadata defining a context menu associated with an inbox applet component;
the inbox applet component, wherein the inbox applet component is configured to, when requested, provide the user interface, wherein
the user interface has an inbox that enables the user to manipulate the task,
the user interface is generated from the second data storage, and
the inbox comprises items of the first data storage; and
logic configured to provide automatic behavior triggered by the task wherein the automatic behavior includes enforcement of a business rule.

2. The computer system of claim 1 wherein:
the inbox provides an indication of tasks for the user;
the foal is selected using a menu bar user interface element;
the task is selected using a screen tab user interface element; and
a first task-based interface is presented in response to selecting the task, wherein,
the first task-based interface and a second task-based interface both use a shared page from among a set of multiple pages,
the first task-based interface presents a first pane and a second page in an order representing the sequence,
navigating between the first page and the second pane causes data entered into the first pare to be validated and saved in a local data context,
the data saved in the local data context is not shared until the task is completed, and
returning to the first pare causes the data to be retrieved.

3. The computer system of claim 1, wherein the user can transfer the task to another user.

4. The computer system of claim 1 wherein the user interface provides an enterprise software application.

5. The computer system of claim 1 wherein information of the inbox is stored in a relational database.

6. The computer system of claim 1 wherein information of the inbox is stored in an extensible markup language.

7. The computer system of claim 1 wherein an application for displaying information of the inbox is defined in the metadata.

8. The computer system of claim 1 wherein the inbox provides an indication of unassigned tasks.

9. The computer system of claim 1 wherein the inbox receives an action from the user relating to a task.

10. The computer system of claim 1 wherein the action is to mark the task as done.

11. The computer system of claim 1 wherein an available action for a task is based on information contained in the task.

12. A method performed by a computing system to, the method comprising:
retrieving metadata from a database, the metadata identifying user interface elements and indicating properties relating to the user interface elements, wherein the database enables flexibility and extensibility through additions to and modifications of the metadata;
retrieving a task from a unit of storage, wherein
the task is a unit of activity that can be performed as a sequence of multiple steps, and
a goal comprises the task and a second task;
providing a user interface that enables a user to manipulate the task, the user interface generated from the retrieved metadata based on an indicated task, the user interface including the inbox, wherein
the user interface comprises the user interface elements, and
the metadata comprises a unit of metadata defining a context menu associated with an inbox applet component;
providing automatic behavior triggered by the task, wherein the automatic behavior comprises enforcement of the business rule; and
storing the task in the unit of storage after the user has manipulated the task.

13. The method of claim 12 wherein the retrieving includes retrieving from a relational database.

14. The method of claim 12 wherein the retrieving includes retrieving from an extensible markup language.

15. A system the system comprising:
a unit of storage;
an inbox applet component, stored in the unit of storage, that retrieves a definition for a user interface from metadata, wherein
the metadata defines the user interface, and
the metadata comprises a unit of metadata for defining a context menu associated with the inbox applet component;
an inbox commands component that receives commands from a user in relation to an inbox and provides the commands to the inbox applet component;
a component that receives a request from the inbox applet component, the request relating to information contained in a database comprising information displayed in the inbox with respect to a task, wherein the task is a unit of activity that can be performed as a sequence of multiple steps, and a goal comprises the task and a second task;

logic configured to provide automatic behavior triggered by the task, wherein the automatic behavior includes enforcement of a business rule.

16. The system of claim 15 wherein the component that receives a request from the inbox applet component abstracts a data provider.

17. The system of claim 16 wherein the data provider retrieves data in a private data context, the private data context identifying data that is not shared with other users.

18. The system of claim 16 wherein the data provider retrieves data in a public data context, the public data context identifying data that is shared with other users.

19. The system of claim 15 wherein the metadata is stored in a relational database.

20. The system of claim 15 wherein the metadata is stored using an extensible markup language.

21. A computer program product in a unit of storage configured to perform a method, the method comprising:

retrieving a definition for a user interface from metadata stored in a unit of storage; and providing the user interface based on the definition, wherein the user interface comprises an inbox, the inbox comprising a task for a user, wherein the task is a unit of activity that can be performed as a sequence of multiple steps, and a goal comprises the task and a second task, the user interface enables the user to manipulate the task, the metadata comprises a unit of metadata defining a context menu associated with the inbox;

providing automatic behavior triggered by the task, wherein the automatic behavior includes enforcement of a business rule; and storing the task in the unit of storage after the user has manipulated the task.

* * * * *

UNITED STATES PATENT AND TRADEMARK OFFICE
CERTIFICATE OF CORRECTION

| | |
|---|---|
| PATENT NO. | : 7,747,959 B2 |
| APPLICATION NO. | : 11/015673 |
| DATED | : June 29, 2010 |
| INVENTOR(S) | : Carl Paul Keller et al. |

It is certified that error appears in the above-identified patent and that said Letters Patent is hereby corrected as shown below:

In column 5, line 53, delete "to." and insert -- to --, therefor.

In column 12, line 37, delete "<name>" and insert -- </name> --, therefor.

In column 13, line 13, delete "<name:xmlns=" and insert -- <name xmlns= --, therefor.

In column 14, line 30, delete "messaqe" and insert -- message --, therefor.

In column 15, line 13, delete "<assignerId >" and insert -- <assignerId> --, therefor.

In column 15, line 15, delete "<dueDate >" and insert -- <dueDate> --, therefor.

In column 17, line 8, delete "<xs:annotation>" and insert -- </xs:annotation> --, therefor.

In column 17, line 49, delete "<xs:annotation>" and insert -- </xs:annotation> --, therefor.

In column 19, line 40, delete ""finishTaskValidationRule" and insert
-- "finishTaskValidationRule" --, therefor.

In column 21, line 53, delete "unbounded>" and insert -- "unbounded"> --, therefor.

In column 21, line 54, delete "<xs annotation>" and insert -- <xs:annotation> --, therefor.

In column 21, line 55, delete "Context" and insert -- context --, therefor.

In column 23, line 48, delete ""taskContext" and insert -- "taskContext" --, therefor.

In column 23, line 49, delete "path"type" and insert -- path" type --, therefor.

Signed and Sealed this
Third Day of May, 2011

David J. Kappos
*Director of the United States Patent and Trademark Office*

CERTIFICATE OF CORRECTION (continued)
U.S. Pat. No. 7,747,959 B2

In column 25, line 6, delete "paramater" and insert -- parameter --, therefor.

In column 25, line 22, delete "path"type" and insert -- path" type --, therefor.

In column 27, line 23, in claim 1, delete "system" and insert -- system, --, therefor.

In column 27, line 47, in claim 1, delete "task" and insert -- task, --, therefor.

In column 27, line 51, in claim 2, delete "foal" and insert -- goal --, therefor.

In column 27, line 60, in claim 2, delete "pane" and insert -- page --, therefor.

In column 27, line 62, in claim 2, delete "pane" and insert -- page --, therefor.

In column 27, line 63, in claim 2, delete "pare" and insert -- page --, therefor.

In column 27, line 67, in claim 2, delete "pare" and insert -- page --, therefor.

In column 28, line 21, in claim 12, delete "system to," and insert -- system, --, therefor.

In column 28, line 51, in claim 15, delete "system" and insert -- system, --, therefor.